Patented Nov. 7, 1950

2,528,708

UNITED STATES PATENT OFFICE 2,528,708

NITRILES FROM ISOBUTYLENE-NITROSYL CHLORIDE ADDUCT

Erhard John Prill, Cresskill, N. J., assignor to Allied Chemical & Dye Corporation, New York, N. Y., a corporation of New York No Drawing. Application July 29, 1948, Serial No. 41,392

6 Claims. (Cl. 260—465.9)

This invention relates to the conversion of isobutylene-nitrosyl chloride adduct to the nitriles methacrylonitrile and α-chlorisobutyronitrile.

The dehydrochlorination of the above adduct has previously been accomplished with agents such as alkali metal salts of acetic acid. To the best of my knowledge, however, isobutylene-nitrosyl chloride adduct has not heretofore been dehydrochlorinated or dehydrated as described below.

I have found that when isobutylene-nitrosyl chloride adduct is heated in a liquid reaction mixture with pyridine and sulfur trioxide, methacrylonitrile and α-chlorisobutyronitrile are formed by the reaction in varying proportions. My process may be operated to produce on the one hand methacrylonitrile with practically no α-chlorisobutyronitrile or at the other extreme, α-chlorisobutyronitrile with little methacrylonitrile; or various mixtures of these two products.

In pure form the isobutylene-nitrosyl chloride adduct referred to herein is a crystalline solid having an elementary composition corresponding to the empirical formula $C_4H_8NOCl$. On the basis of its molecular weight in benzene solution the product is bimolecular. This fact combined with its showing an ultra-violet absorption spectrum characteristic of the nitroso group indicates that the solid adduct should be regarded as a bis-nitroso compound. The melting point of the solid adduct recrystallized from benzene is about 104° C. (with decomposition). Methods for the preparation of this solid have been described in the art, for example U. S. P. 2,394,430 of February 5, 1946 to Crowder et al. The above-discussed compound is referred to herein as isobutylene-nitrosyl chloride adduct.

In my process described herein it is not essential that the pure adduct be treated. For example the treatment of the total crude product of the isobutylene-nitrosyl chloride reaction including the liquid by-product is permissible but at most only slightly increases the total amount of nitriles obtained as compared to the amount obtained from the isolated solid adduct. The fact that the adduct is more stable in purified form than in crude form is a reason for preferring to employ the purified adduct as starting material for my process.

Solid isobutylene-nitrosyl chloride adduct separated by filtration from the liquid by-product and recrystallized from benzene or simply washed with e. g. petroleum ether and air-dried is a satisfactory starting material. The liquid by-product of the isobutylene-nitrosyl chloride reaction may be treated separately from the main crystalline product and will yield some nitriles but the nitrile yield from the liquid by-product is relatively low compared to that from the crystalline product.

The pyridine referred to herein need not be the pure compound; for example it may be a fraction from natural sources. Suitable fractions will contain major proportions of pyridine and may contain minor proportions of other organic bases and inert materials. A disadvantage from presence of organic base impurities is that they may cause losses of sulfur trioxide by oxidation reactions involving sulfur trioxide and said impurities.

The relative proportions of methacrylonitrile and α-chlorisobutyronitrile obtained in my process depend chiefly on the proportion of pyridine available for reaction with the hydrogen chloride of the adduct. For maximum yields of methacrylonitrile at least sufficient pyridine must be present to form monopyridinium salts both with the sulfuric acid which is generated by hydrolysis from the sulfur trioxide and with the hydrogen chloride content of the isobutylene-nitrosyl chloride adduct. An excess of pyridine over this amount has no particular effect on the yields of nitriles.

If α-chlorisobutyronitrile is desired as a product then the amount of pyridine employed will be less than when a maximum yield of methacrylonitrile is desired, and suitably is about a molar equivalent of the sulfur trioxide present as a reactant.

The dehydrating agent employed in my process for producing nitriles is sulfur trioxide plus pyridine and may be introduced into the reaction zone in the form of an addition product of sulfur trioxide with pyridine. The addition product may be formed as described in U. S. Patent 1,835,841 by adding sulfur trioxide to a cooled, stirred mixture of pyridine and an inert solvent. It is a stable solid at room temperature, and is liquid at 100° C.

The mol ratio of dehydrating agent to isobutylene-nitrosyl chloride adduct employed in my process is suitably one equivalent of dehydrating agent per mol of $H_2O$ which can be formed from the quantity of adduct taken as starting material (i. e. one mol of dehydrating agent per mol of adduct regarded as a monomer). However, an excess of dehydrating agent may be used with no adverse effect on yield. Thus, the full amount of dehydrating agent required for one reaction cycle may be present in a reaction mixture to which the isobutylene-nitrosyl chloride adduct is supplied in successive small portions, so that a large excess of dehydrating agent is present during most of the reaction.

Temperatures suitable for carrying out my reaction are from about 30° to about 200° C. The temperatures preferably employed are above about 60° C.; i. e. high enough to effect rapid interaction between the reactants and avoid any considerable accumulation of reactants in either a continuous or a batchwise operation, as accumulated reactants may enter into sudden and violent reaction. Preferred reaction temperatures are in the range from about the boiling point of methacrylonitrile at atmospheric pressure (90° C.) to the initial boiling point at atmospheric pressure (suitably about 160° C.) of the liquid being used as reaction medium.

Methacrylonitrile is not greatly affected by the reaction mixture formed in my process under reaction conditions. Accordingly the time during which the reaction mixture remains in the reaction zone, while it should be long enough for reaction to occur, may exceed the time required for reaction. A preferred mode of carrying out my process involves continuously removing the volatile reaction products from the reaction zone, e. g. by distillation, as fresh reactants are introduced; but, if desired, the products may instead be separated batchwise from the reaction mixture after the full amount of all reactants for one reaction cycle has been brought into reaction.

Addition of small amounts of potassium iodide to my reaction mixtures may somewhat increase the yields of methacrylonitrile obtainable, but is not a necessary step.

The following examples are illustrative of the process of my invention but are to be understood as illustrative only and not as limiting the scope of the invention:

*Example 1.*—A solid addition product of pyridine and sulfur trioxide (formed by adding 50 grams—0.625 mol—of sulfur trioxide to a cooled stirred solution of 50 grams of pyridine—0.625 mol—in cold carbon tetrachloride as described in U. S. P. 1,835,841 of December 8, 1931) was mixed with 61 grams (0.5 mol based on the monomeric formula) of isobutylene-nitrosyl chloride adduct and 4 grams of potassium iodide. The mixture was introduced into a reaction vessel containing as reaction medium at 130° C. 150 cc. of kerosene, $H_2SO_4$-treated and of initial boiling point 160° C.; 40 grams of free pyridine; and a further 4 grams of potassium iodide. The free pyridine in the reaction medium corresponds to one mol of pyridine per mol of HCl contained in the adduct. The introduction of reactants proceeded at a rate to maintain the reaction temperature at 120–140° C. and took about 90 minutes. The reaction mixture was allowed to stand overnight and then the volatile products were distilled out of the reaction vessel and the methacrylonitrile fraction was collected, and purified by extraction with water. A 59.5 mol percent yield of methacrylonitrile on the starting adduct was found. No substantial amounts of α-chlorisobutyronitrile were found in the above described experiment.

*Example 2.*—Pyridine-sulfur trioxide addition product was formed from 49 grams (0.62 mol) of pyridine and 50 grams (0.625 mol) of sulfur trioxide. This addition product and 150 ml. of sulfuric acid-treated kerosene of initial boiling point 160° C. were heated in a reaction vessel to about 90° C. and 61 grams of solid isobutylene-nitrosyl chloride adduct were introduced into the reaction mixture portionwise during the course of 90 minutes. The temperature of the reaction mixture during this time varied from about 85° to 95° C. The mixture was then heated for one hour at 95° C.

The products were recovered by pouring into water, extracting the aqueous layer with ether, drying the combined organic layers, and fractionating the dried organic material in the presence of hydroquinone inhibitor. The methacrylonitrile fraction thus obtained represented 26 mol percent of the theoretical yield and the α-chlorisobutyronitrile fraction represented 55 mol percent of the theoretical yield obtainable from the amount of adduct taken at the start. The total nitriles were 81 percent of theory.

Various procedures are suitable for carrying out my process of heating together isobutylene-nitrosyl chloride adduct, pyridine, and sulfur trioxide to obtain nitriles. The adduct and the pyridine-sulfur trioxide dehydrating agent may be mixed in the cold and added to hot liquid reaction medium. Or the adduct alone or in solution e. g. in chloroform may be added slowly to the hot pyridine-sulfur trioxide reaction mixture.

The methacrylonitrile product may be recovered by various methods, e. g. by continuous distillation out of the reaction mixture followed by fractionation of the distillate, by fractionation out of the reaction mixture after the reaction is over, or by adding water to the cooled reaction mixture and then extracting e. g. with ether, drying, and fractionating the ether extract.

I claim:

1. The process which comprises heating a liquid reaction mixture containing isobutylene-nitrosyl chloride adduct, pyridine, and sulfur trioxide and continuing heating until nitrile has been formed.

2. A process in accordance with claim 1 in which the number of mols of sulfur trioxide present in the reaction mixture is at least about equal to the number of mols of adduct, regarded as a monomer, present and the number of mols of pyridine present is at least about equal to the number of mols of sulfur trioxide present.

3. A process in accordance with claim 2 in which the reaction temperatures are above about 60° C.

4. A process in accordance with claim 2 in which the number of mols of pyridine present is at least equal to the number of mols of sulfur trioxide present plus the number of mols of adduct regarded as a monomer present.

5. A process in accordance with claim 4 in which the reaction temperatures are between about 60° and about 200° C.

6. A process in accordance with claim 4 in which the reaction temperatures are between about 90° and about 160° C. and pressures are atmospheric.

ERHARD JOHN PRILL.

REFERENCES CITED

The following references are of record in the file of this patent:

UNITED STATES PATENTS

| Number | Name | Date |
|---|---|---|
| 1,835,841 | Beckett et al. | Dec. 8, 1931 |
| 1,876,652 | Fischl et al. | Sept. 13, 1932 |

(Other references on following page)

UNITED STATES PATENTS

| Number | Name | Date |
|---|---|---|
| 2,037,389 | Nicodemus et al. | Apr. 14, 1936 |
| 2,328,984 | Lichty | Sept. 7, 1943 |
| 2,375,005 | Kung | May 1, 1945 |
| 2,394,430 | Crowder et al. | Feb. 5, 1946 |
| 2,417,024 | Tuerck et al. | Mar. 4, 1947 |
| 2,417,749 | Hagemeyer | Mar. 18, 1947 |
| 2,471,928 | Bortnick et al. | May 31, 1949 |
| 2,471,994 | Wooster | May 31, 1949 |

OTHER REFERENCES

Moreu, Bull. soc. chim. de France, vol. 11, pages 1067–1068 (1894).

Mowry, Chem. Reviews, vol. 42, pages 250–257 (1948).